United States Patent
Liang et al.

(10) Patent No.: US 10,337,410 B2
(45) Date of Patent: Jul. 2, 2019

(54) ANALYSIS METHOD FOR MEASUREMENT ERROR OF OPERATING PARAMETERS OF GAS TURBINE AND CONTROL APPARATUS

(71) Applicant: Siemens Aktiengesellschaft, Munich (DE)

(72) Inventors: Feng Liang, Shanghai (CN); Song Jun Lv, Shanghai (CN); Shi Yun Tang, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 220 days.

(21) Appl. No.: 15/034,012

(22) PCT Filed: Dec. 31, 2014

(86) PCT No.: PCT/CN2014/096004
§ 371 (c)(1),
(2) Date: May 3, 2016

(87) PCT Pub. No.: WO2015/101338
PCT Pub. Date: Jul. 9, 2015

(65) Prior Publication Data
US 2016/0298549 A1    Oct. 13, 2016

(30) Foreign Application Priority Data

Dec. 31, 2013 (WO) ................ PCT/CN2013/091155

(51) Int. Cl.
| | |
|---|---|
| F02C 9/00 | (2006.01) |
| G01M 15/14 | (2006.01) |
| G05B 23/02 | (2006.01) |

(52) U.S. Cl.
CPC ............... *F02C 9/00* (2013.01); *G01M 15/14* (2013.01); *G05B 23/0235* (2013.01);
(Continued)

(58) Field of Classification Search
CPC .......... F02C 9/00; F02C 9/26; F05D 2220/32; F05D 2270/301; F05D 2270/3015;
(Continued)

(56) References Cited

U.S. PATENT DOCUMENTS

| | | | |
|---|---|---|---|
| 4,249,238 | A | 2/1981 | Spang, III et al. |
| 6,016,465 | A | 1/2000 | Kelly |

(Continued)

FOREIGN PATENT DOCUMENTS

| | | |
|---|---|---|
| CN | 101364084 A | 2/2009 |
| CN | 101382512 A | 3/2009 |

(Continued)

OTHER PUBLICATIONS

International Search Report PCT/ISA/210 for International Application No. PCT/CN2014/096004 dated Mar. 27, 2015.
(Continued)

*Primary Examiner* — Elias Desta
(74) *Attorney, Agent, or Firm* — Harness, Dickey & Pierce, P.L.C.

(57) ABSTRACT

An analysis method is disclosed for detecting a measurement error of operating parameters of a gas turbine. An embodiment of the method includes: obtaining multiple measured values of the operating parameters, the operating parameters being at least part of the variables of multiple functions, each of the functions including analysis ranges; putting the measured values of the operating parameters into the functions whose variables include the operating parameters to calculate the results of the functions; comparing the calculated results of the functions with the analysis ranges of the corresponding functions; identifying one or more measured values of operating parameters who are at least part of the variables of the functions whose calculated results fail to fall within the analysis ranges of the corresponding func-
(Continued)

tions; and determining a measured value of an operating parameter including the highest likelihood of a measurement error.

5 Claims, 4 Drawing Sheets

(52) U.S. Cl.
CPC ..... *G05B 23/0254* (2013.01); *G05B 23/0275* (2013.01); *F05D 2220/32* (2013.01); *F05D 2270/301* (2013.01); *F05D 2270/303* (2013.01); *F05D 2270/306* (2013.01); *F05D 2270/3015* (2013.01)

(58) Field of Classification Search
CPC ......... F05D 2270/303; F05D 2270/306; G05B 23/0235; G05B 23/0254; G05B 23/0275; G01M 15/14
See application file for complete search history.

(56) References Cited

U.S. PATENT DOCUMENTS

| | | | |
|---|---|---|---|
| 6,526,358 | B1 | 2/2003 | Mathews, Jr. et al. |
| 6,598,195 | B1 | 7/2003 | Adibhatla et al. |
| 6,606,580 | B1* | 8/2003 | Zedda ............... G05B 13/0265 702/182 |
| 6,741,919 | B1 | 5/2004 | Schuster et al. |
| 7,251,582 | B2* | 7/2007 | Singh ............... G05B 23/0254 702/183 |
| 7,603,222 | B2 | 10/2009 | Wiseman et al. |
| 2008/0170245 | A1 | 7/2008 | Gross et al. |
| 2008/0276155 | A1 | 11/2008 | Shim |
| 2009/0064682 | A1 | 3/2009 | Healy |
| 2009/0276184 | A1 | 11/2009 | Mylaraswamy |
| 2011/0146291 | A1 | 6/2011 | Hartzer |
| 2013/0066615 | A1 | 3/2013 | Mitchell |

FOREIGN PATENT DOCUMENTS

| | | |
|---|---|---|
| CN | 102128087 A | 7/2011 |
| CN | 102175460 A | 9/2011 |
| CN | 102589824 A | 7/2012 |
| CN | 103061891 A | 4/2013 |
| CN | 103154440 A | 6/2013 |
| EP | 0978772 A2 | 2/2000 |
| EP | 1096122 A1 | 5/2001 |
| EP | 1213562 A2 | 6/2002 |
| EP | 2469041 A1 | 6/2012 |
| EP | 2697695 A2 | 2/2014 |
| JP | 2002168661 A | 6/2002 |
| JP | 2004257388 A | 9/2004 |
| JP | 2005331944 A | 12/2005 |
| JP | 2009271912 A | 11/2009 |
| WO | WO 2006012854 A1 | 2/2006 |
| WO | WO 2012118564 A2 | 9/2012 |
| WO | WO 2012/164075 | 12/2012 |

OTHER PUBLICATIONS

Written Opinion of the International Searching Authority PCT/ISA/237 for International Application No. PCT/CN2014/096004 dated Mar. 27, 2015.
Inseok Hwang et al: "A Survey of Fault Detection, Isolation, and Reconfiguration Methods"; IEEE Transactions on Control Systems Technology; IEEE Service Center, New York; NY; US; vol. 18 No. 3; pp. 636-653; XP011296278.
Extended European Search Report dated Sep. 22, 2017.
Chinese Office Action dated Dec. 4, 2017.
Japanese Office Action dated May 23, 2017.

\* cited by examiner

ANALYSIS METHOD FOR MEASUREMENT ERROR OF OPERATING PARAMETERS OF GAS TURBINE AND CONTROL APPARATUS

PRIORITY STATEMENT

This application is the national phase under 35 U.S.C. § 371 of PCT International Application No. PCT/CN2014/096004 which has an International filing date of Dec. 31, 2014, which designated the United States of America and which claims priority to PCT International Application No. PCT/CN2013/091155 filed Dec. 31, 2013, the entire contents of which are hereby incorporated herein by reference.

BACKGROUND

Field

An embodiment of the present invention generally relates to the field of gas turbines, and more particularly to the field of control of gas turbines.

Background

A gas turbine comprises a compressor section, a combustor section and a turbine section. Sensors are usually arranged at multiple positions in the three sections. These sensors provide a control system of the gas turbine with operating parameters, such as operating pressure, operating temperature, and a gas flow rate in the compressor, for the control system to monitor the operating state of the gas turbine, control its operating parameters. For example, a sensor usually needs to be disposed at a fuel system, an air system or a gas system in the turbine section to detect the value of an operating parameter such as pressure, temperature, and a flow rate in this section.

A measured value that is detected by a sensor normally reflects the actual value of an operating parameter at a position in a gas turbine. However, a measured value deviates from an actual value when a failure occurs in a sensor. In this situation, the measured value inaccurately reflects an operating state at the position. When a control system of a gas turbine receives the measured value that does not actually reflect an actual value, the control system inaccurately determines an operating state of a gas turbine, which may cause the gas turbine to operate unstably and even cause valve trip.

SUMMARY

An embodiment of the present invention provides an analysis method for detecting a measurement error of operating parameters of a gas turbine, so as to determine an error value that deviates from an actual value.

An embodiment is directed to an analysis method comprising: obtaining multiple measured values of the operating parameters, the operating parameters being at least part of the variables of multiple functions, wherein each of the functions has a predetermined analysis ranges; putting the measured values of the operating parameters into the functions whose variables include the operating parameters to calculate the results of the functions; comparing the calculated results of the functions with the analysis ranges of the corresponding functions; identifying one or more measured values of operating parameters who are at least part of the variables of the functions whose calculated results fail to fall within the predetermined analysis ranges of the corresponding functions; and determining among the identified one or more measured values that a measured values of an operating parameter which is not a variable of the functions whose calculated results fall within the predetermined analysis ranges of the corresponding functions has the highest likelihood of a measurement error.

In an embodiment, a controller for a gas turbine is programmed to execute an embodiment of an analysis method for detecting a measurement error of operating parameters of a gas turbine. The analysis method comprises the following steps: obtaining multiple measured values of the operating parameters, the operating parameters being at least part of the variables of multiple functions, wherein each of the functions has a predetermined analysis ranges; putting the measured values of the operating parameters into the functions whose variables include the operating parameters to calculate the results of the functions; comparing the calculated results of the functions with the analysis ranges of the corresponding functions; identifying one or more measured values of operating parameters who are at least part of the variables of the functions whose calculated results fail to fall within the predetermined analysis ranges of the corresponding functions, and determining among the identified one or more measured values that a measured values of an operating parameter which is not a variable of the functions whose calculated results fall within the predetermined analysis ranges of the corresponding functions has the highest likelihood of a measurement error.

In an embodiment, a fuel gas system of a gas turbine comprises: a fuel line for transporting fuel gas to the gas turbine, sensors measuring multiple values of physical operating parameters of the fuel in the fuel line; and a programmable controller programmed to execute an embodiment of the analysis method.

BRIEF DESCRIPTION OF THE DRAWINGS

The disclosure will become more fully understood from the detailed description given herein below for illustration only, and thus are not limitative of the disclosure, and wherein.

The present invention is merely described and explained for example, with reference to the following accompanying drawings, and do not limit the scope of the present invention.

REFERENCE NUMERALS

Figure 1:
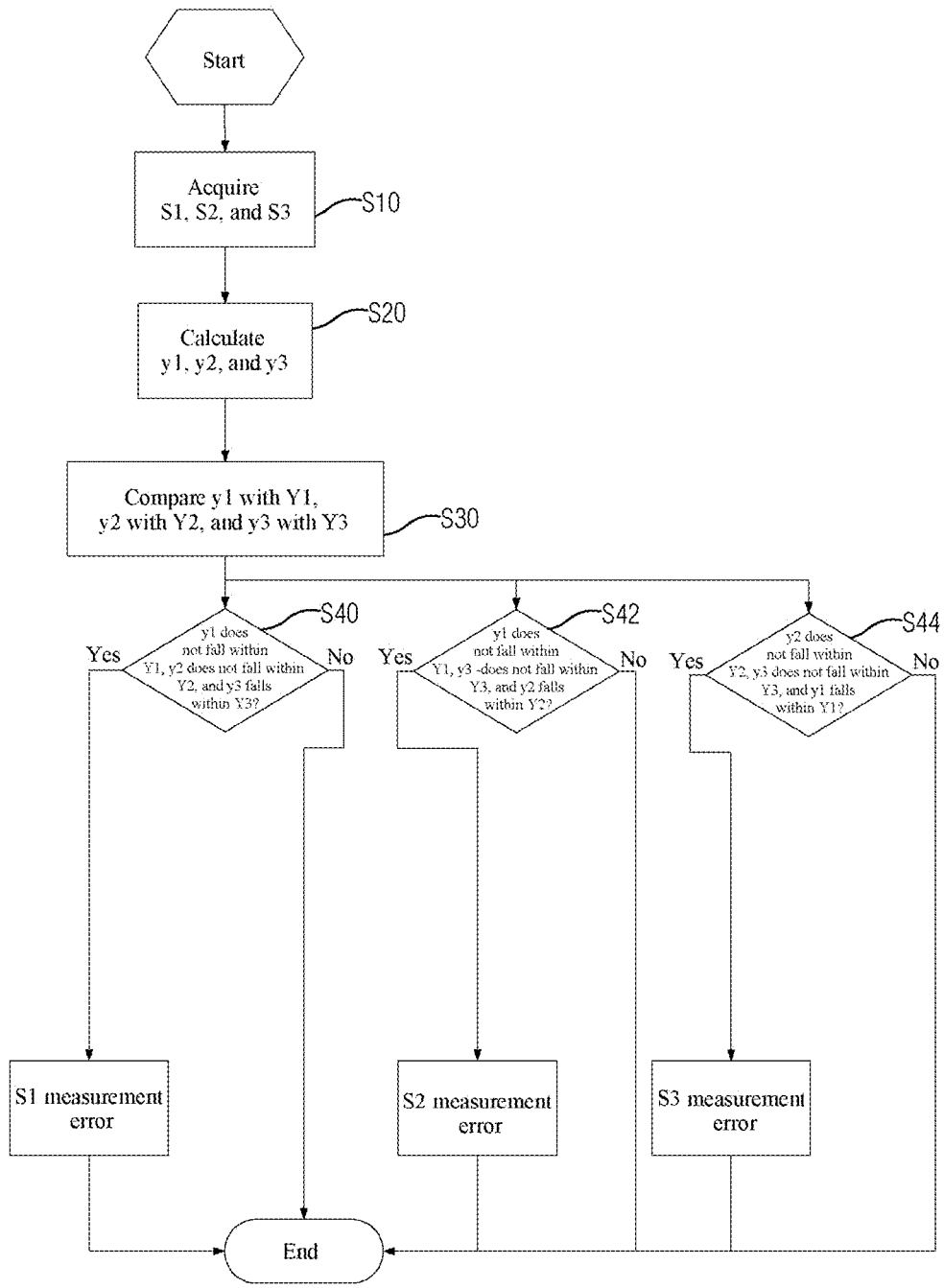
FIG. 1 is used for describing an analysis process in a analysis method for a measured value in a gas turbine.

10 Main line
12 Trip valve
14, 18, 21, 26, 31, 36 Pressure sensor
16, 28, 38 Temperature sensor
20 First branch line
22 First control valve
24, 34 Flow rate sensor
25, 35 Pressure difference sensor
30 Second branch line
32 Second control valve
33 Controller

DETAILED DESCRIPTION OF THE EXAMPLE EMBODIMENTS

To make the technical features, objectives, and effects of embodiments of the present invention more comprehensible, the specific implementation manners of embodiments of the present invention are described with reference to the accompanying drawings. The same reference numerals in the drawings denote same parts.

"Exemplary" herein indicates "serving as an instance, an example or description", and any drawing or implementation manner that is described to be "exemplary" herein should not be construed as a more preferred or more advantageous technical solution.

To keep the drawings simple, only parts related to embodiments of the present invention are exemplarily indicated in each drawing, and the parts are schematic and may not represent the actual parts used in a product. In addition, to make the drawings simple and comprehensible, for members having the same structure or function in some drawings, only one of the members is exemplary drawn or only one is marked.

"One" herein not only indicates "only one" but also may indicate a case of being "more than one". "First", "second" and the like herein are only used for differentiation from each other rather than to indicate relative importance or an order.

An embodiment is directed to an analysis method comprising: obtaining multiple measured values of the operating parameters, the operating parameters being at least part of the variables of multiple functions, wherein each of the functions has a predetermined analysis ranges; putting the measured values of the operating parameters into the functions whose variables include the operating parameters to calculate the results of the functions; comparing the calculated results of the functions with the analysis ranges of the corresponding functions; identifying one or more measured values of operating parameters who are at least part of the variables of the functions whose calculated results fail to fall within the predetermined analysis ranges of the corresponding functions; and determining among the identified one or more measured values that a measured values of an operating parameter which is not a variable of the functions whose calculated results fall within the predetermined analysis ranges of the corresponding functions has the highest likelihood of a measurement error.

An analysis range of the foregoing function may be a threshold range of the function, or may also be a threshold range plus an allowable error range. The term "the functions related to the operating parameters" refers to functions whose variables include the operating parameters.

In an embodiment, the analysis method further comprises: obtaining a calculated value of the measured value which is determined to have the highest likelihood of the measurement error by using the medium value of the analysis range of any function containing the measured value; and replacing the measured value with the calculated value as a correction value.

In an embodiment, the analysis method further comprise: obtaining the average of calculated values from multiple functions containing the measured value (namely, the variables of the functions include the measured value) which is determined to have the highest likelihood of the measurement error, wherein the calculated values are obtained by using the medium value of the analysis ranges of the functions containing the measured value; and replacing the measured value with the average of the calculated values as a correction value.

In an embodiment, the operating parameters of the gas turbine comprise temperature, pressure, flow and pressure difference of a fluid in the gas turbine. The multiple measured values of the operating parameters include the measured values of operating parameters of a gas turbine oil system, an air system and a gas system.

In an embodiment, a controller for a gas turbine is programmed to execute an embodiment of an analysis method for detecting a measurement error of operating parameters of a gas turbine. The analysis method comprises the following steps: obtaining multiple measured values of the operating parameters, the operating parameters being at least part of the variables of multiple functions, wherein each of the functions has a predetermined analysis ranges; putting the measured values of the operating parameters into the functions whose variables include the operating parameters to calculate the results of the functions; comparing the calculated results of the functions with the analysis ranges of the corresponding functions; identifying one or more measured values of operating parameters who are at least part of the variables of the functions whose calculated results fail to fall within the predetermined analysis ranges of the corresponding functions, and determining among the identified one or more measured values that a measured values of an operating parameter which is not a variable of the functions whose calculated results fall within the predetermined analysis ranges of the corresponding functions has the highest likelihood of a measurement error.

In an embodiment, a fuel gas system of a gas turbine comprises: a fuel line for transporting fuel gas to the gas turbine, sensors measuring multiple values of physical operating parameters of the fuel in the fuel line; and a programmable controller programmed to execute an embodiment of the analysis method.

In an embodiment, the controller signals which sensor commits the measurement error.

To make the technical features, objectives, and effects of embodiments of the present invention more comprehensible, the specific implementation manners of embodiments of the present invention are described with reference to the accompanying drawings. The same reference numerals in the drawings denote same parts.

Herein, "f1", "f2", "f3", and "f10", "f11", "f12", "f13", "f14", "f15", "f16", "f17", and "f18" are used for indicate different functions.

FIG. 1 is used for describing an analysis process in an analysis method for a measured value in a gas turbine. The measured value of the gas turbine includes one first measured value S1, one second measured value S2, and one third measured value S3, which are separately obtained through measurement by sensors at different installation positions in the gas turbine. In addition, functional relationships exist between these measured values: for example, a first analysis function y1=f1(S1, S2) whose variables include the first measured value S1 and the second measured value S2; a second analysis function y2=f2(S1, S3) whose variables include the first measured value S1 and the third measured value S3; and a third analysis function y3=f3(S2, S3) whose variables include the second measured value S2 and the third measured value S3.

When the gas turbine operates normally and each measured values can accurately reflect the actual operating state of a gas turbine, and meanwhile measurement precision of the first measured value S1, the second measured value S2, and the third measured value S3 further needs to be taken into consideration, the range of the first analysis function is defined as one first analysis range Y1, the range of the second analysis function is defined as one second analysis range Y2, and the range of the third analysis function is defined as one third analysis range Y3.

In Step S10, acquire the first measured value S1, the second measured value S2, and the third measured value S3. Next, the process turns to Step S20.

In Step S20, substitute the first measured value S1 and the second measured value S2 into the first analysis function y1=f1(S1, S2) and obtain a first analysis value y1 through calculation; substitute the first measured value S1 and the third measured value S3 into the second analysis function y2=f2(S1, S3) and obtain a second analysis value y2 through calculation; and substitute the second measured value S2 and the third measured value S3 into the third analysis function y3=f3(S2, S3) and obtain a third analysis value y3 through calculation. The process then turns to Step S30.

In Step S30, compare the first analysis value y1 with the first analysis range Y1, compare the second analysis value y2 with the second analysis range Y2, and compare the third analysis value y3 with the third analysis range Y3. The process turns to Step S40, S42, and S44 simultaneously.

In Step S40, determine whether the first analysis value y1 does not fall within the first analysis range Y1, the second analysis value y2 does not fall within the second analysis range Y2, and the third analysis value y3 falls within the third analysis range Y3. If the determination result is no, end the analysis process. If the determination result is yes, determine that the first measured value S1 that both the first analysis function and the second analysis function have but the third analysis function does not have has the highest likelihood of a measurement error, that is, that the first measured value deviates from the actual value at the installation position of the sensor is most likely to occur, and end the analysis process.

In Step S42, determine whether the first analysis value y1 does not fall within the first analysis range Y1, the third analysis value y3 does not fall within the third analysis range Y3, and the second analysis value y2 falls within the second analysis range Y2. If the determination result is no, end the analysis process. If the determination result is yes, determine that the second measured value S2 which is the common variable of both the first analysis function and the third analysis function but not the variable of the second analysis function has the highest likelihood of a measurement error, that is, that the second detected value deviates from the actual value of an operating parameter at the installation position of the sensor is most likely to occur, and then end the analysis process.

In Step S44, determine whether the second analysis value y2 does not fall within the second analysis range Y2, the third analysis value y3 does not fall within the third analysis range Y3, and the first analysis value y1 falls within the first analysis range Y1. If the determination result is no, end the analysis process. If the determination result is yes, determine that the third measured value S3 which is the variable of both the second analysis function and the third analysis function but not the variable of the first analysis function has the highest likelihood of a measurement error, that is, that the third measured value deviates from the actual value of an operating parameter at the installation position of the sensor is most likely to occur, and end the analysis process.

In the analysis method for a measured value in a gas turbine, each measured value is substituted into a corresponding analysis function to obtain a analysis function value through calculation, and a analysis function whose analysis function value does not fall within a analysis range corresponding to the analysis function is found. A measured value that all these functions have in common is found, so as to analyze and discover, on line and in real time, a measured value that most likely deviates from the actual value, thereby avoiding that a control system of the gas turbine uses an erroneous measured value causing the entire gas turbine to operate unstably or even causing trip.

In an exemplary implementation manner of the analysis method for a measured value in a gas turbine, If it is determined that a measurement error occurs to the first measured value S1, the second measured value S2 and a value in the first analysis range may be substituted into the first analysis function to obtain one first calculated value, which may be used as a correction value for the first measured value, and the first calculated value can reflect the actual operation state of the gas turbine (that is, the actual value) at the installation position of a sensor. Preferably, the medium value of the first analysis range is substituted into the first analysis function. Because the second measured value S2 is correct, only the first measured value S1 is unknown in the first analysis function. Hence, the first calculated value can be obtained from the first analysis function through calculation. Furthermore, an average of the calculation values that are obtainable from multiple functions in the foregoing manner may be obtained through calculation, and the average may be used to replace the corresponding measured value to which a measurement error occurs. By using an example in which it is determined that a measurement error occurs to the first measured value S1, the first measured value S1 is a variable in the first analysis function y1=f1(S1, S2) and the second analysis function y2=f2(S1, S3). First, the medium value of the first analysis range is substituted into the first analysis function. Because the second measured value S2 is known and correct, so that the first calculated value can be obtained through calculation. Next, the medium value of the second analysis range is substituted into the second analysis function. Because the third measured value S3 is known and correct, the second calculated value can be obtained through calculation. An average value of the first calculated value and the second calculated value is calculated, and the average value can reflect an actual operation state of an operating parameter at the installation position of the sensor of the first measured value. The average value is used as the correction value for the first measured value S1.

If it is determined that a measurement error occurs to the second measured value S2, the third measured value S3 and a value in the third analysis range are substituted into the third analysis function to obtain one second calculated value through calculation, which may be used as a correction value for the second measured value. The second calculated value can reflect the actual operation state at the installation position of the sensor of the second measured value. The calculation process is similar to that of the first calculated value, and is no longer elaborated herein.

Figure 2:
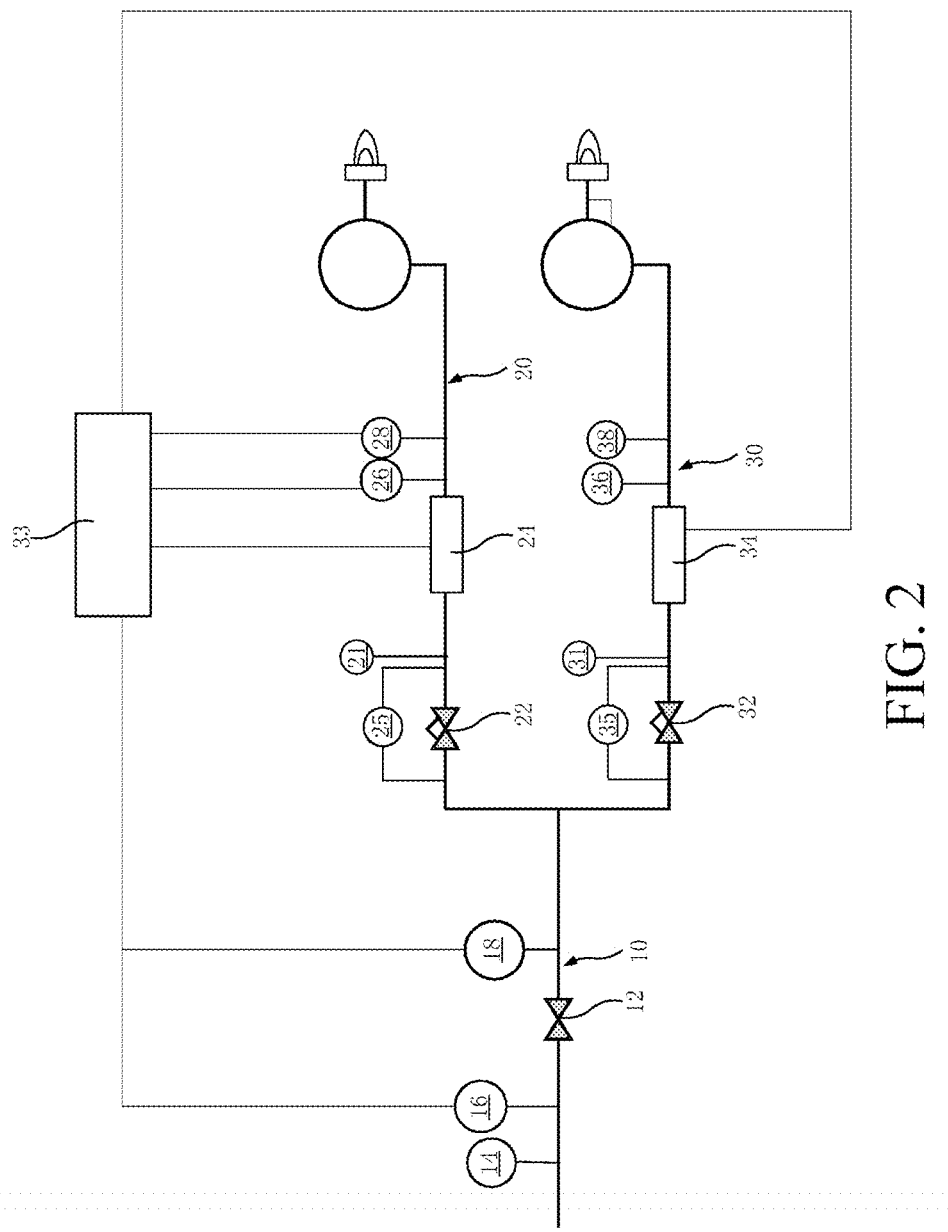
FIG. 2 is a schematic structural diagram of a gas supply system in a gas turbine.

If it is determined that a measurement error occurs to the third measured value S3, the second measured value S2 and a value in the second analysis range are substituted into the second analysis function to obtain one third calculated value through calculation, which may be used as a correction value for the third measured value. The third calculated value can reflect the actual operation state at the installation position of the sensor of the third measured value. The calculation process is similar to that of the first calculated quantity, and is no longer elaborated herein. FIG. 2 is a schematic structural diagram of a gas supply system in a gas turbine, and is used for describing a analysis method for a measured value in a gas turbine; however, the analysis method for a measured value in a gas turbine is not limited to the gas supply system in FIG. 2, and may further be applied to another system, for example, a fuel system, a gas system or an air system, in a gas turbine. As shown in FIG. 2, the gas supply system in the gas turbine includes one main line 10, one first branch line 20, and one second branch line 30.

One trip valve 12 is disposed on the first main line 10. At the first main line 10 and along a movement path of gas, one pressure sensor 14 and one temperature sensor 16 are disposed at the upstream of the trip valve 12. One pressure sensor 18 is disposed at the downstream of the trip valve 12. The pressure sensor 14 outputs a measured value P0 that represents the pressure at an installation position of the pressure sensor 14, the temperature sensor 16 outputs a measured value T0 that represents the temperature at an installation position of the temperature sensor 16, and the pressure sensor 18 outputs a measured value P1 that represents the pressure at an installation position of the pressure sensor 18.

One first control valve 22 is disposed at the first branch line 20. At the first branch line 20 and along the movement path of the gas, one flow rate sensor 24 is disposed at the downstream of the first control valve 22. One pressure sensor 21 is disposed between the flow rate sensor 24 and the first control valve 22. One pressure sensor 26 and one temperature sensor 28 are disposed at the downstream of the flow rate sensor 24. One pressure difference sensor 25 that can measure a gas pressure difference between an inlet and an outlet of the first control valve 22 is further disposed at the first control valve 22. The flow rate sensor 24 can output a measured value m_PM that represents a gas flow rate at an installation position of the flow rate sensor 24, the pressure sensor 21 may output a measured value P2PM that represents the pressure at an installation position of the pressure sensor 21, the pressure sensor 26 may output a measured value P3PM that represents the pressure at an installation position of the pressure sensor 26, the temperature sensor 28 may output a measured value T3PM that represents the temperature at an installation position of the temperature sensor 28, and the pressure difference sensor 25 may output a measured value dp_CVPM that represents a pressure difference at an installation position of the pressure difference sensor 25. The suffix PM of each parameter represents a measured value of each sensor of the first branch line.

One second control valve 32 is disposed at the second branch line 30. At the second branch line 30 and along the movement path of gas, one flow rate sensor 34 is disposed at the downstream of the second control valve 32. One pressure sensor 31 is disposed between the flow rate sensor 34 and the second control valve 32. One pressure sensor 36 and one temperature sensor 38 are disposed at the downstream of the flow rate sensor 34. One pressure difference sensor 35 that can measure a gas pressure difference between an inlet and an outlet of the second control valve 32 is further disposed at the second control valve 32.

The flow rate sensor 34 may output a measured value m_PG that represents a gas flow rate at an installation position of the flow rate sensor 34, the pressure sensor 31 may output a measured value P2PG that represents the pressure at an installation position of the pressure sensor 31, the pressure sensor 36 may output a measured value P3PG that represents the pressure at an installation position of the pressure sensor 36, the temperature sensor 38 may output a measured value T3PG that represents the temperature at an installation position of the temperature sensor 38, and the pressure difference sensor 35 may output a measured value dp_CVPG that represents a pressure difference at an installation position of the pressure difference sensor 35. The suffix PG of each parameter represents a measured value of each sensor of the second branch line.

The first analysis function $y1=f10(P0, P1, T0)$ is related to the measured values P0, P1, and T0, namely, P0, P1, and T0 are the variables of the first analysis function. The specific expression of the first analysis function may derive from existing calculation formulas reflecting fluid mechanics. When the gas turbine operates normally and the measured values P0, P1, and T0 accurately reflect their actual operation state, y1 that is obtained through calculation by substituting the measured values P0, P1, and T0 into the first analysis function while taking measurement precision of the measured values P0, P1, and T0 into consideration falls within the first analysis range Y1, that is, the range of the first analysis function.

The second analysis function $y2=f11(P1, P2PM, dp\_CVPM)$ is related to the measured values P1, P2PM, and dp_CVPM and the specific expression of the second analysis function may be derived from existing calculation formulas related to fluid mechanics. When the gas turbine operates normally and the measured values P1, P2PM, and dp_CVPM accurately reflect their actual operation state, y2 that is obtained through calculation by substituting the measured values P1, P2PM, and dp_CVPM into the second analysis function while taking measurement precision of the measured values P1, P2PM, and dp_CVPM into consideration falls within the second analysis range Y2, that is, the range of the second analysis function.

The third analysis function $y3=f12(P1, P2PG, dp\_CVPG)$ is related to the measured values P1, P2PG, and dp_CVPG and the specific expression of the third analysis function may be derived from existing calculation formulas related to fluid mechanics. When the gas turbine operates normally and the measured values P1, P2PG, and dp_CVPG accurately reflect their actual operation state, y3 that is obtained through calculation by substituting the measured values P1, P2PG, and dp_CVPG into the third analysis function while taking measurement precision of the measured values P1, P2PG, and dp_CVPG into consideration falls within the third analysis range Y3, that is, the range of the third analysis function.

A fourth analysis function $y4=f13(P2PM, P3PM, T3PM, m\_PM)$ is related to the measured values P2PM, P3PM, T3PM, and m_PM and the specific expression of the fourth analysis function may be derived from existing calculation formulas related to fluid mechanics. When the gas turbine operates normally and the measured values P2PM, P3PM, T3PM, and m_PM accurately reflect their actual operation state, y4 that is obtained through calculation by substituting the measured values P2PM, P3PM, T3PM, and m_PM into the fourth analysis function while taking measurement precision of the measured values P2PM, P3PM, T3PM, and m_PM into consideration falls within a fourth analysis range Y4, that is, the range of the fourth analysis function.

A fifth analysis function $y5=f14(P2PG, P3PG, T3PG, m\_PG)$ is related to the measured values P2PG, P3PG, T3PG, and m_PG and the specific expression of the fifth analysis function may be derived from existing calculation formulas related to fluid mechanics. When the gas turbine operates normally and the measured values P2PG, P3PG, T3PG, and m_PG accurately reflect their actual operation state, y5 that is obtained through calculation by substituting the measured values P2PG, P3PG, T3PG, and m_PG into the fifth analysis function while taking measurement precision of the measured values P2PG, P3PG, T3PG, and m_PG into consideration falls within the fifth analysis range Y5, that is, the range of the fifth analysis function.

A sixth analysis function $y6=f15(T0, T3PM, T3PG)$ is related to the measured values T0, T3PM, and T3PG and the specific expression of the sixth analysis function may be derived from existing calculation formulas related to fluid mechanics. When the gas turbine operates normally and the measured values T0, T3PM, and T3PG accurately reflect their actual operation state, y6 that is obtained through calculation by substituting the measured values T0, T3PM, and T3PG into the sixth analysis function while taking measurement precision of the measured values P0, P1, and T0 into consideration falls within a sixth analysis range Y6, that is, the range of the sixth analysis function.

A seventh analysis function y7=f16(P1, dp_CVPM, T0, m_PM) is related to the measured values P1, dp_CVPM, T0, and m_PM and the specific expression of the seventh analysis function may be derived from existing calculation formulas related to fluid mechanics. When the gas turbine operates normally and the measured values P1, dp_CVPM, T0, and m_PM accurately reflect their actual operation state, y7 that is obtained through calculation by substituting the measured values P1, dp_CVPM, T0, and m_PM into the seventh analysis function while taking measurement precision of the measured values P1, dp_CVPM, T0, and m_PM into consideration falls within a seventh analysis range Y7, that is, the range of the seventh analysis function.

An eighth analysis function y8=f17(P1, dp_CVPG, T0, m_PG) is related to the measured values P1, dp_CVPG, T0, and m_PG and the specific expression of the eighth analysis function may be derived from existing calculation formulas related to fluid mechanics. When the gas turbine operates normally and the measured values P1, dp_CVPG, T0, and m_PG accurately reflect their actual operation state, y8 that is obtained through calculation by substituting the measured values P1, dp_CVPG, T0, and m_PG into the eighth analysis function while taking measurement precision of the measured values P1, dp_CVPG, T0, and m_PG into consideration falls within an eighth analysis range Y8, that is, the range of the eighth analysis function.

A ninth analysis function y9=f18(P0, P1, T0, m_PG, m_PM) is related to the measured values P0, P1, T0, m_PG, and m_PM and the specific expression of the ninth analysis function may be derived from existing calculation formulas related to fluid mechanics. When the gas turbine operates normally and the measured values P0, P1, T0, m_PG, and m_PM accurately reflect their actual operation state, y9 that is obtained through calculation by substituting the measured values P0, P1, T0, m_PG, and m_PM into the ninth analysis function while taking measurement precision of the measured values P0, P1, T0, m_PG, and m_PM into consideration falls within a ninth analysis range, that is, the range of the ninth analysis function.

Figures 3, 3A:
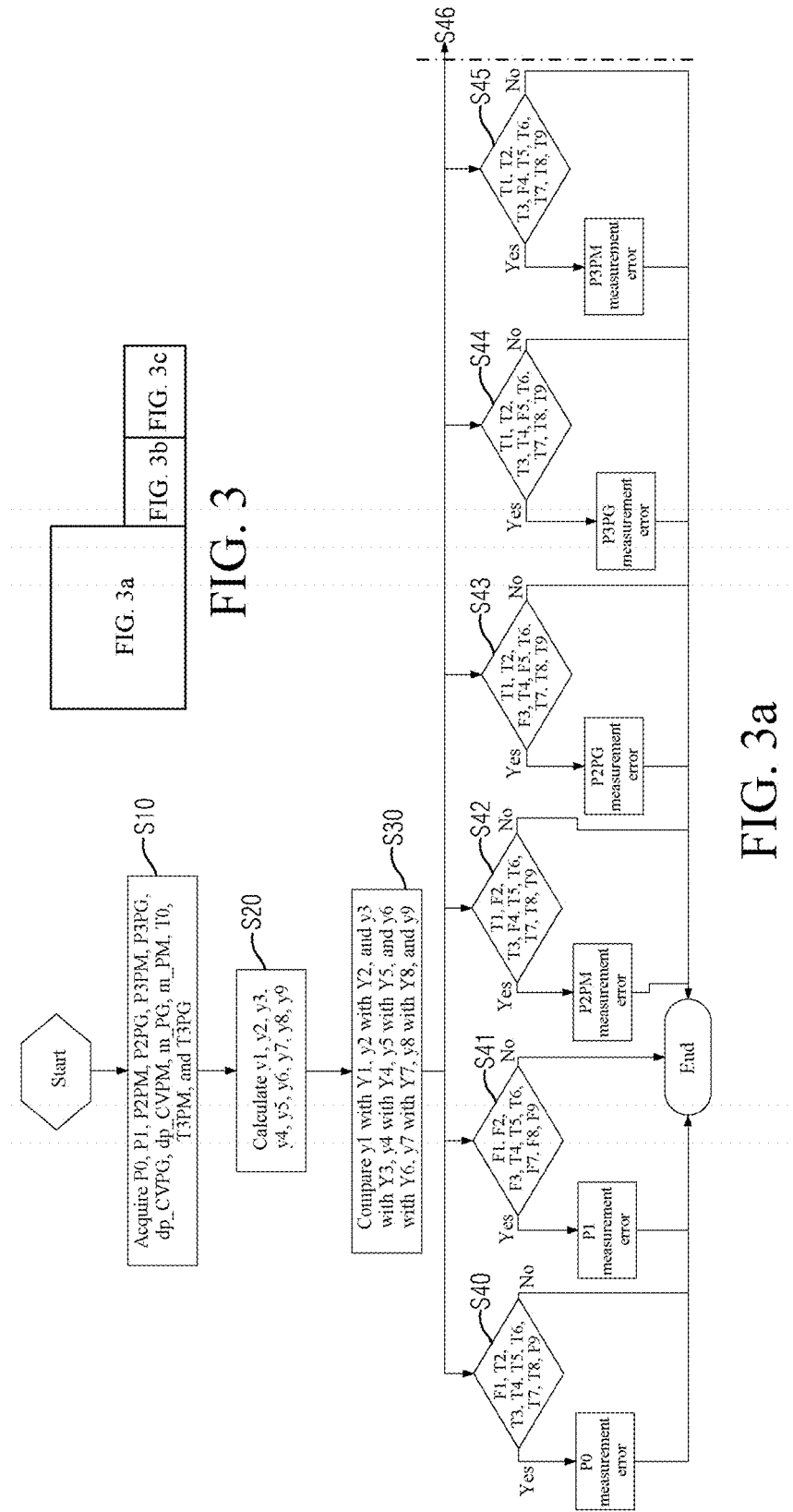
FIG. 3 is used for describing a analysis method for a measured value in FIG. 2.
Figure 3B:
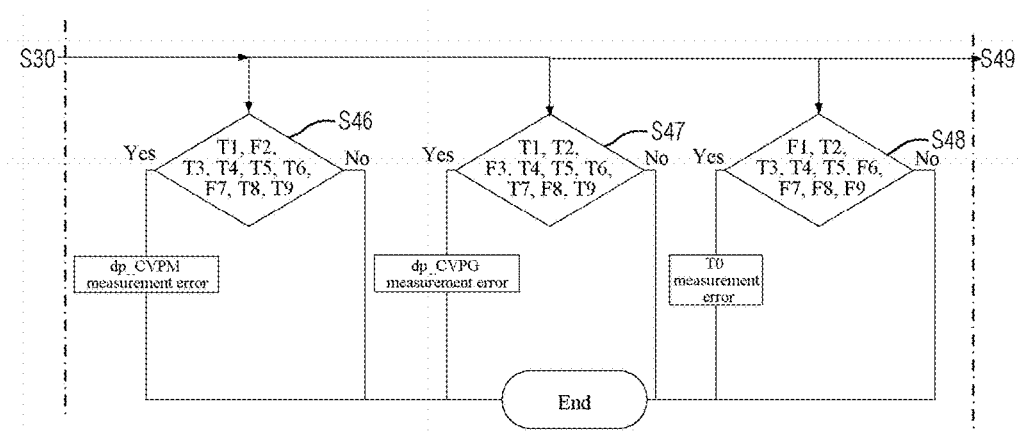
Figure 3C:
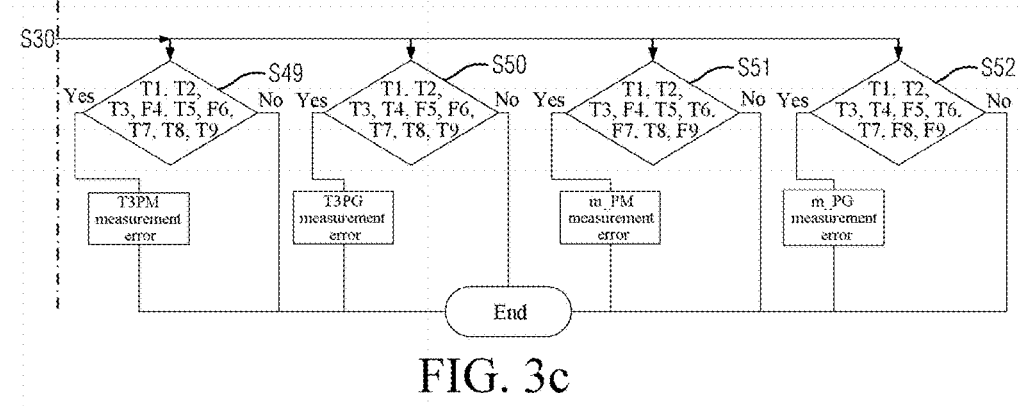

FIG. 3 is used for describing a analysis method for a measurement error of a measured value in FIG. 2, where FIG. 3 is separately drawn in FIGS. 3a, 3b, and 3c. As shown in FIG. 3, in Step S10, the measured values P0, P1, P2PM, P2PG, P3PM, P3PG, dp_CVPG, dp_CVPM, m_PG, m_PM, T0, T3PM, and T3PG are acquired. The process turns to Step S20.

In Step S20, the acquired measured values P0, P1, and T0 are substituted into the first analysis function y1=f10(P0, P1, T0) to obtain the first analysis value y1 through calculation. The acquired measured values P1, P2PM, and dp_CVPM are substituted into the second analysis function y2=f11(P1, P2PM, dp_CVPM) to obtain the second analysis value y2 through calculation. The acquired measured values P1, P2PG, and dp_CVPG are substituted into the third analysis function y3=f12(P1, P2PG, dp_CVPG) to obtain the third analysis value y3 through calculation. The acquired measured values P2PM, P3PM, T3PM, and m_PM are substituted into the fourth analysis function y4=f13(P2PM, P3PM, T3PM, m_PM) to obtain the fourth analysis value y4 through calculation. The acquired measured values P2PG, P3PG, T3PG, and m_PG are substituted into the fifth analysis function y5=f14(P2PG, P3PG, T3PG, m_PG) to obtain the fifth analysis value y5 through calculation. The acquired measured values T0, T3PM, and T3PG are substituted into the sixth analysis function y6=f15(T0, T3PM, T3PG) to obtain the sixth analysis value y6 through calculation. The acquired measured values P1, dp_CVPM, T0, and m_PM are substituted into the seventh analysis function y7=f16(P1, dp_CVPM, T0, m_PM) to obtain the seventh analysis value y7 through calculation. The acquired measured values P1, dp_CVPG, T0, and m_PG are substituted into the eighth analysis function y8=f17(P1, dp_CVPG, T0, m_PG) to obtain the eighth analysis value y8 through calculation. The acquired measured values P0, P1, T0, m_PG, and m_PM are substituted into the ninth analysis function y9=f18(P0, P1, T0, m_PG, m_PM) to obtain the ninth analysis value y9 through calculation. The process enters Step S30.

In Step S30, compare the function value y1 of the first analysis function with the first analysis range Y1. If the function value y1 of the first analysis function does not fall within the first analysis range Y1, add a mark F1; or if the function value y1 of the first analysis function falls within the first analysis range Y1, add a mark T1.

Compare the function value y2 of the second analysis function with the second analysis range Y2. If the function value y2 of the second analysis function does not fall within the second analysis range Y2, add a mark F2; or if the function value y2 of the second analysis function falls within the second analysis range Y2, add a mark T2.

Compare the function value y3 of the third analysis function with the third analysis range Y3. If the function value y3 of the third analysis function does not fall within the third analysis range Y3, add a mark F3; or if the function value y3 of the third analysis function falls within the third analysis range Y3, add a mark T3.

Compare the function value y4 of the fourth analysis function with the fourth analysis range Y4. If the function value y4 of the fourth analysis function does not fall within the fourth analysis range Y4, add a mark F4; or if the function value y4 of the fourth analysis function falls within the fourth analysis range Y4, add a mark T4.

Compare the function value y5 of the fifth analysis function with the fifth analysis range Y5. If the function value y5 of the fifth analysis function does not fall within the fifth analysis range Y5, add a mark F5; or if the function value y5 of the fifth analysis function falls within the fifth analysis range Y5, add a mark T5.

Compare the function value y6 of the sixth analysis function with the sixth analysis range Y6. If the function value y6 of the sixth analysis function does not fall within the sixth analysis range Y6, add a mark F6; or if the function value y6 of the sixth analysis function falls within the sixth analysis range Y6, add a mark T6.

Compare the function value y7 of the seventh analysis function with the seventh analysis range Y7. If the function value y7 of the seventh analysis function does not fall within the seventh analysis range Y7, add a mark F7; or if the function value y7 of the seventh analysis function falls within the seventh analysis range Y7, add a mark T7.

Compare the function value y8 of the eighth analysis function with the eighth analysis range Y8. If the function value y8 of the eighth analysis function does not fall within the eighth analysis range Y8, add a mark F8; or if the function value y8 of the eighth analysis function falls within the eighth analysis range Y8, add a mark T8.

Compare the function value y9 of the ninth analysis function with the ninth analysis range Y9. If the function value y9 of the ninth analysis function does not fall within the ninth analysis range Y9, add a mark F9; or if the function value y9 of the ninth analysis function falls within the ninth analysis range Y9, add a mark T9. The process enters Steps S40, S41, S42, S43, S44, S45, S46, S47, S48, S49, S50, S51, and S52 simultaneously.

In Step S40, determine whether the comparison result in Step S30 is F1, T2, T3, T4, T5, T6, T7, T8, F9. If the determination result is yes, determine that the measured value P0 that both the first analysis function and the ninth analysis function have has the highest likelihood of a measurement error, and end the analysis process. Otherwise, end the analysis process.

In Step S41, determine whether the comparison result in Step S30 is F1, F2, F3, T4, T5, T6, F7, F8, F9. If the determination result is yes, determine that the measured value P1 that the first analysis function, the second analysis function, the third analysis function, the seventh analysis function, the eighth analysis function, and the ninth analysis function all have in common has the highest likelihood of a measurement error, and end the analysis process. Otherwise, end the analysis process.

In Step S42, determine whether the comparison result in Step S30 is T1, F2, T3, F4, T5, T6, T7, T8, T9. If the determination result is yes, determine that the measured value P2PM that both the second analysis function and the fourth analysis function have has the highest likelihood of a measurement error, and end the analysis process. Otherwise, end the analysis process.

In Step S43, determine whether the comparison result in Step S30 is T1, T2, F3, T4, F5, T6, T7, T8, T9. If the determination result is yes, determine that the measured value P2PG that both the third analysis function and the fifth analysis function have has the highest likelihood of a measurement error, and end the analysis process. Otherwise, end the analysis process.

In Step S44, determine whether the comparison result in Step S30 is T1, T2, T3, T4, F5, T6, T7, T8, T9. If the determination result is yes, determine that the measured value P3PG has the highest likelihood of a measurement error, and end the analysis process. Otherwise, end the analysis process.

In Step S45, determine whether the comparison result in Step S30 is T1, T2, T3, F4, T5, T6, T7, T8, T9. If the determination result is yes, determine that the measured value P3PM has the highest likelihood of a measurement error, and end the analysis process. Otherwise, end the analysis process.

In Step S46, determine whether the comparison result in Step S30 is T1, F2, T3, T4, T5, T6, F7, T8, T9. If the determination result is yes, determine that the measured value dp_CVPM that both the second analysis function and the seventh analysis function have has the highest likelihood of a measurement error, and end the analysis process. Otherwise, end the analysis process.

In Step S47, determine whether the comparison result in Step S30 is T1, T2, F3, T4, T5, T6, T7, F8, T9. If the determination result is yes, determine that the measured value dp_CVPG that both the third analysis function and the eighth analysis function have has the highest likelihood of a measurement error, and end the analysis process. Otherwise, end the analysis process.

In Step S48, determine whether the comparison result in Step S30 is F1, T2, T3, T4, T5, F6, F7, F8, F9. If the determination result is yes, determine that the measured value T0 that the first analysis function, the sixth analysis function, the seventh analysis function, the eighth analysis function, and the ninth analysis function all have in common has the highest likelihood of a measurement error, and end the analysis process. Otherwise, end the analysis process.

In Step S49, determine whether the comparison result in Step S30 is T1, T2, T3, F4, T5, F6, T7, T8, T9. If the determination result is yes, determine that the measured value T3PM that both the fourth analysis function and the sixth analysis function have has the highest likelihood of a measurement error, and end the analysis process. Otherwise, end the analysis process.

In Step S50, determine whether the comparison result in Step S30 is T1, T2, T3, T4, F5, F6, T7, T8, T9. If the determination result is yes, determine that the measured value T3PG that both the fifth analysis function and the sixth analysis function have has the highest likelihood of a measurement error, and end the analysis process. Otherwise, end the analysis process.

In Step S51, determine whether the comparison result in Step S30 is T1, T2, T3, F4, T5, T6, F7, T8, F9. If the determination result is yes, determine that the measured value m_PM that the fourth analysis function, the seventh analysis function, and the ninth analysis function all have in common has the highest likelihood of a measurement error, and end the analysis process. Otherwise, end the analysis process.

In Step S52, determine whether the comparison result in Step S30 is T1, T2, T3, T4, F5, T6, T7, F8, F9. If the determination result is yes, determine that the measured value m_PG that the fifth analysis function, the eighth analysis function, and the ninth analysis function all have in common has the highest likelihood of a measurement error, and end the analysis process. Otherwise, end the analysis process.

When it is determined that a measurement error occurs to the measured value P0, the medium value of the first analysis range Y1 is substituted into y1=f10(P0, P1, T0), where the measured values P1 and T0 are known in the formula, one calculated value corresponding to P0 is obtained through calculation, and the calculated value can reflect actual gas pressure at the installation position of the pressure sensor 14.

When it is determined that a measurement error occurs to the measured value P1, the medium value of the second analysis range Y2 is substituted into y2=f11(P1, P2PM, dp_CVPM), where the measured values P2PM and dp_CVPM are known in the formula, one calculated value corresponding to P1 is obtained through calculation, and the calculated value can reflect actual gas pressure at the installation position of the pressure sensor 18.

When it is determined that a measurement error occurs to the measured value P2PM, the medium value of the second analysis range Y2 is substituted into y2=f11(P1, P2PM, dp_CVPM), where the measured values P1 and dp_CVPM are known in the formula, one calculated value corresponding to P2PM is obtained through calculation, and the calculated value can reflect actual gas pressure at the installation position of the pressure sensor 21.

When it is determined that a measurement error occurs to the measured value P2PG, the medium value of the third analysis range Y3 is substituted into y3=f12 (P1, P2PG, dp_CVPG), where the measured values P1 and dp_CVPG are known in the formula, one calculated value corresponding to P2PG is obtained through calculation, and the calculated value can reflect actual gas pressure at the installation position of the pressure sensor 31.

When it is determined that a measurement error occurs to the measured value P3PM, the medium value of the fourth analysis range Y4 is substituted into y4=f13(P2PM, P3PM, T3PM, m_PM), where the measured values P2PM, T3PM, and m_PM are known in the formula, one calculated value corresponding to P3PM is obtained through calculation, and the calculated value can reflect actual gas pressure at the installation position of the pressure sensor 26.

When it is determined that a measurement error occurs to the measured value P3PG, the medium value of the fifth analysis range Y5 is substituted into y5=f14(P2PG, P3PG, T3PG, m_PG), where the measured values P2PG, T3PG, and m_PG are known in the formula, one calculated value corresponding to P3PG is obtained through calculation, and the calculated value can reflect actual gas pressure at the installation position of the pressure sensor 36.

When it is determined that a measurement error occurs to the measured value dp_CVPM, the medium value of the second analysis range Y2 is substituted into y2=f11(P1, P2PM, dp_CVPM), where the measured values P1 and P2PM are known in the formula, one calculated value corresponding to dp_CVPM is obtained through calculation, and the calculated value can reflect an actual gas pressure difference at the installation position of the pressure difference sensor 25.

When it is determined that a measurement error occurs to the measured value dp_CVPG, the medium value of the third analysis range Y3 is substituted into y3=f12(P1, P2PG, dp_CVPG), where the measured values P1 and P2PG are known in the formula, one calculated value corresponding to dp_CVPG is obtained through calculation, and the calculated value can reflect an actual gas pressure difference at the installation position of the pressure difference sensor 35.

When it is determined that a measurement error occurs to the measured value T0, the medium value of the sixth analysis range Y6 is substituted into y6=f15(T0, T3PM, T3PG), where T3PM and T3PG are known in the formula, one calculated value corresponding to T0 is obtained through calculation, and the calculated value can reflect actual gas temperature at the installation position of the temperature sensor 16.

When it is determined that a measurement error occurs to the measured value T3PM, the medium value of the sixth analysis range Y6 is substituted into y6=f15 (T0, T3PM, T3PG), where T0 and T3PG are known in the formula, one calculated value corresponding to T3PM is obtained through calculation, and the calculated value can reflect actual gas temperature at the installation position of the temperature sensor 28.

When it is determined that a measurement error occurs to the measured value T3PG, the medium value of the sixth analysis range Y6 is substituted into y6=f15 (T0, T3PM, T3PG), where T0 and T3PM are known in the formula, one calculated value corresponding to T3PG is obtained through calculation, and the calculated value can reflect actual gas temperature at the installation position of the temperature sensor 38.

When it is determined that a measurement error occurs to the measured value m_PM, the medium value of the seventh analysis range Y7 is substituted into y7=f16 (P1, dp_CVPM, T0, m_PM), where P1, dp_CVPM, and T0 are known in the formula, one calculated value corresponding to m_PM is obtained through calculation, and the calculated value can reflect an actual gas flow rate at an installation position of the flow rate sensor 24.

When it is determined that a measurement error occurs to the measured value m_PG, the medium value of the eighth analysis range Y8 is substituted into y8=f17 (P1, dp_CVPG, T0, m_PG), where P1, dp_CVPG, and T0 are known in the formula, one calculated value corresponding to m_PG is obtained through calculation, and the calculated value can reflect an actual gas flow rate at the installation position of the flow rate sensor 34.

A program for implementing the analysis method can be implemented by software, and the software can be stored in a programmable controller 33. The controller 33 receives measured values of operating parameters of the gas turbine that are detected by the pressure sensors 14, 18, 21, the temperature sensor 16, the flow rate sensor 24, the pressure sensor 26, and the like. Next, the steps in the foregoing methods are executed to determine a measured value in which a measurement error occurs. The controller 33 can also send a signal to indicate to which sensor a measurement error occurs.

A fuel gas system of a gas turbine is disclosed in another aspect of the invention. The fuel gas system comprises a fuel line 10, 20, 30 for transporting fuel gas to the gas turbine, sensors 14, 16, 18, 21, 24, 25, 26, 28, 31, 34, 35, 36, 38 measuring multiple values of physical operating parameters of the fuel in the fuel line 10, 20, 30; and a programmable controller 33. The controller 33 may signals which sensor commits the measurement error.

It should be understood that although the embodiments are described in the specification, it is not that each embodiment only includes one independent technical solution. Such an illustration manner in the specification is merely for the purpose of clarity, and persons skilled in the art should take the specification as a whole, and the technical solutions in the embodiments may also be properly combined to form other implementation manners comprehensible to persons skilled in the art.

The series of detailed descriptions list above are merely detailed descriptions of feasible embodiments of the present invention, and are not intended to limit the protection scope of the present invention. Any equivalent implementation solutions or changes such as combinations, segmentations or repetitions of features made without departing from the techniques and spirit of the present invention shall fall within the protection scope of the present invention.

What is claimed is:

1. A fuel gas system of a gas turbine, comprising:
    a fuel line to transport fuel gas to the gas turbine;
    a plurality of sensors to respectively measure multiple values of respective physical operating parameters of the fuel gas in the fuel line; and
    a programmable controller for the gas turbine programmed to execute an analysis method for detecting a measurement error of operating parameters of a gas turbine, the controller being configured to:
    put measured values of operating parameters into functions whose variables include the operating parameters, to calculate results of the functions;
    compare the results of the functions, once calculated, with respective analysis ranges of the respective corresponding functions;
    identify, based upon the comparison, one or more measured values of operating parameters who are at least part of the variables of the respective functions whose calculated results fail to fall within the analysis ranges of the respective corresponding functions;

determine, among the identified one or more measured values, a measured value of a physical operating parameter which is not a variable of the respective function whose calculated results fall within the analysis ranges of the respective corresponding functions has a relatively highest likelihood of a measurement error; and signal which of the sensors of the fuel gas system corresponds to the measured value of the physical operating parameter determined to have the relatively highest likelihood of the measurement error.

2. The controller of claim 1, wherein the controller is further configured to:

obtain a calculated value of the measured value determined to have the relatively highest likelihood of the measurement error by using a medium value of the analysis range of a function containing the measured value; and replace the measured value with the obtained calculated value as a correction value.

3. The controller of claim 1, wherein the controller is further configured to:

obtain an average of the values, once calculated, of the functions containing the measured value determined to have the relatively highest likelihood of the measurement error, wherein the calculated values are obtained by using a medium value of the analysis ranges of the functions containing the measured value; and replace the measured value with the obtained average of the calculated values as a correction value.

4. The controller of claim 1, wherein the physical operating parameters of the gas turbine comprise temperature, pressure, flow and pressure difference of a fluid in the gas turbine.

5. The controller of claim 4, wherein the multiple measured values of the physical operating parameters include the measured values of operating parameters of a gas turbine oil system, an air system and a gas system.

* * * * *